(12) United States Patent
Stevenson et al.

(10) Patent No.: US 7,379,245 B2
(45) Date of Patent: May 27, 2008

(54) ARTICLES INCLUDING FILMS WITH MATING STRUCTURED SURFACES

(75) Inventors: James A. Stevenson, St. Paul, MN (US); Michael S. Groess, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 206 days.

(21) Appl. No.: 11/145,753

(22) Filed: Jun. 6, 2005

(65) Prior Publication Data

US 2006/0274437 A1   Dec. 7, 2006

(51) Int. Cl.
*G02B 5/02* (2006.01)
*G02B 13/20* (2006.01)
*G02F 1/1335* (2006.01)

(52) U.S. Cl. .................... 359/599; 349/112
(58) Field of Classification Search ............. 359/485, 359/486, 487, 494, 496, 501, 599; 349/64, 349/96, 112; 428/41.8, 67, 77, 202, 352
See application file for complete search history.

(56) References Cited

U.S. PATENT DOCUMENTS

| | | | |
|---|---|---|---|
| 4,925,714 A | * | 5/1990 | Freedman ........... 428/41.9 |
| 5,512,219 A | | 4/1996 | Rowland |
| 5,771,328 A | * | 6/1998 | Wortman et al. ........ 385/146 |
| 5,885,490 A | | 3/1999 | Kawaguchi |
| 5,922,238 A | | 7/1999 | Savant |
| 6,262,140 B1 | | 7/2001 | Savant |
| 6,354,709 B1 | * | 3/2002 | Campbell et al. ........ 362/627 |
| 6,356,391 B1 | * | 3/2002 | Gardiner et al. ........ 359/628 |
| 6,908,295 B2 | * | 6/2005 | Thielman et al. ........ 425/371 |
| 2002/0080598 A1 | | 6/2002 | Parker |
| 2002/0157776 A1 | | 10/2002 | Currens et al. |
| 2006/0093809 A1 | * | 5/2006 | Hebrink et al. ........ 428/323 |

FOREIGN PATENT DOCUMENTS

| | | |
|---|---|---|
| EP | 0 389 114 A | 9/1990 |
| JP | HEI 6 214103 | 8/1994 |
| WO | WO 98/19004 A | 5/1998 |
| WO | WO 02/14909 A | 2/2002 |
| WO | WO 2005/003822 A | 1/2005 |

* cited by examiner

Primary Examiner—Alessandro Amari (57) ABSTRACT

Articles produced according to the present disclosure include a first film having a structured surface and a second film having a structured surface. The structured surface of the first film is releaseably mated with the structured surface of the second film. In some exemplary embodiments, such articles may be optical bodies including first and second optical films having structured surfaces. Methods of making such articles, which may be optical bodies, are also disclosed.

16 Claims, 5 Drawing Sheets

ARTICLES INCLUDING FILMS WITH MATING STRUCTURED SURFACES

FIELD OF THE INVENTION

The present disclosure is directed to articles including films with mating structured surfaces and methods of making such articles.

BACKGROUND

Films having at least one structured surface have many uses, including but not limited to display devices. Display devices, such as liquid crystal display ("LCD") devices, are used in a variety of applications including, for example, televisions, hand-held devices, digital still cameras, video cameras, and computer monitors. An LCD offers several advantages over a traditional cathode ray tube ("CRT") display such as decreased weight, unit size and power consumption. However, an LCD panel is not self-illuminating and, therefore, requires a backlighting assembly or a "backlight." A backlight typically couples light from one or more sources (e.g., a cold cathode fluorescent tube ("CCFT") or light emitting diode ("LED")) to a substantially planar output, e.g., via a light guide. The planar output is then coupled to the LCD panel.

The performance of an LCD is often judged by its brightness. Brightness of an LCD may be enhanced by using a larger number of light sources or brighter light sources. In large area displays it is often necessary to use a direct-lit type LCD backlight to maintain brightness, because the space available for light sources grows linearly with the perimeter while the illuminated area grows as the square of the perimeter. Therefore, LCD televisions typically use a direct-lit backlight instead of an edge-lit light-guide type LCD backlight. Additional light sources and/or a brighter light source may consume more energy, which is counter to the ability to decrease the power allocation to the display device. For portable devices this may correlate to decreased battery life. In addition, adding a light source to the display device may increase the product cost and weight and sometimes can lead to reduced reliability of the display device.

Brightness of an LCD device may be enhanced by more efficiently utilizing the light that is available within the LCD device (e.g., to direct more of the available light within the display device along a preferred viewing axis). For example, Vikuiti™ Brightness Enhancement Film ("BEF"), available from 3M Company, has linear prismatic surface structures, which redirect some of the light exiting the backlight outside the viewing range to be substantially along the viewing axis. At least some of the remaining light is recycled via multiple reflections of some of the light between BEF and reflective components of the backlight, such as its back reflector. This results in optical gain substantially along the viewing axis, and also results in improved spatial uniformity of the illumination of the LCD. Thus, BEF is advantageous, for example, because it enhances brightness and improves spatial uniformity. For a battery powered portable device, this may translate to longer running times or smaller battery size, and a display that provides a better viewing experience.

SUMMARY

In one implementation of the present disclosure, it is directed to an article including a first film product having a structured surface and a second film product having a structured surface. The structured surface of the first film is releaseably mated with the structured surface of the second film.

In another implementation of the present disclosure, it is directed to an article comprising a first optical film having a structured surface and a second optical film having a structured surface. The structured surface of the first optical film is releaseably mated to the structured surface of the second optical film.

These and other aspects of the articles and methods of the subject invention will become more readily apparent to those having ordinary skill in the art from the following detailed description together with the drawings.

BRIEF DESCRIPTION OF THE DRAWINGS

So that those having ordinary skill in the art to which the subject invention pertains will more readily understand how to make and use the subject invention, exemplary embodiments thereof will be described in detail below with reference to the drawings, wherein.

DETAILED DESCRIPTION

The present disclosure is directed to articles including films with mating structured surfaces and to methods of making such articles. In some exemplary implementations, the present disclosure is directed to optical bodies including optical films with mating structured surfaces and to methods of making such optical bodies.

Traditionally, structured films, such as optical films having at least one structured surface, have been replicated from a reusable tool. In contrast, the present disclosure teaches the use of a structured surface of a film product, such as an optical film product, to produce a mating structured surface of another film product, which also may be an optical film product. The films thus produced can form a composite article, such as a composite optical body, which can be left intact for as long as it is desired, for example, for the duration of the product shipment to a customer or for the duration of processing the product, such as conversion of the product into a smaller component. Alternatively, the individual films of an exemplary article according to the present disclosure can be separated shortly or immediately after their production.

The individual films contained in exemplary articles of the present disclosure may have any thickness suitable for such film's specific application. Typically, however, such individual films are relatively thin so as to make them flexible. In some exemplary embodiments, the individual films have a thickness of about 750 microns or less, 375 microns or less, 75 microns or less or 50 microns or less. For example, the individual films can have a maximum thickness of about 750 microns or less, 375 microns or less, 75 microns or less or 50 microns or less.

Figure 1:
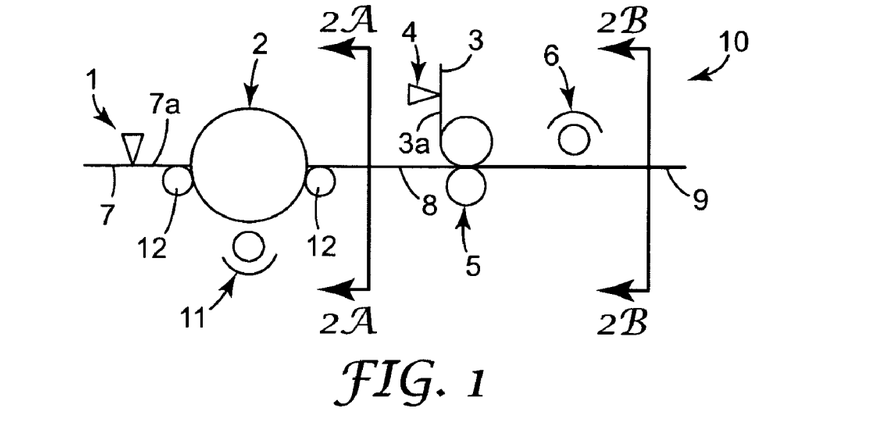
FIG. 1 illustrates schematically exemplary methods and exemplary apparatuses for making articles according to the present disclosure.

FIG. 1 illustrates schematically exemplary methods and an exemplary apparatus 10 for making articles according to the present disclosure. The apparatus 10 includes a first die 1 for coating a first flexible substrate 7 with a first layer of solidifiable material 7a. On one hand, the first layer of material 7a is discharged from the die 1 in sufficiently liquid or flowing state to form a coating on the first flexible substrate 7, and, on the other hand, the layer of material 7a is capable of being subsequently solidified to retain a particular shape. Various materials can be used for the first flexible substrate 7. Where the methods described herein are used to make an optical body, it is contemplated that the flexible substrate usually will include a substantially optically transparent material, or, in some exemplary embodiments, a substantially optically clear material. Exemplary materials suitable for making flexible substrates include, but are not limited to, polymeric materials, such as acrylics, polycarbonates, polypropylenes, polyurethane, polystyrene, polyesters, polyethylenes, such as polyethylene naphthalate (PEN), polyethylene terephthalate (PET), polyvinyl chloride, copolymers of any of these materials and other suitable materials.

The first layer of solidifiable material 7a useful for making optical bodies usually will include a substantially optically transparent material, or, in some exemplary embodiments, a substantially optically clear material. Exemplary materials suitable for use as the solidifiable material 7a include suitable polymeric materials, for example, radiation (e.g., UV radiation or heat) curable materials, thermoplastic materials, thermo set materials and others. Exemplary suitable radiation curable materials include acrylics, such as poly (methyl methacrylate) (PMMA), UV radiation curable acrylate resins, such those described in US 2002/0123589, now U.S. Pat. No. 6,541,591, the disclosure of which is hereby incorporated by reference herein, and radiation (e.g., UV radiation) curable resins disclosed in U.S. Pat. Nos. 5,254,390 and 4,576,850, the disclosures of which are incorporated by reference herein. In some exemplary embodiments, the refractive index of the material of the first solidifiable layer 7a can be higher than that of at least a layer of the first flexible substrate 7 or it can be lower than that of at least a layer of the first flexible substrate 7. In one exemplary embodiment, the first substrate is a polyester film and the solidifiable material is resin, such as a UV light-curable resin. Other exemplary embodiments may include the first solidifiable layer 7a that is formed from a material having substantially the same refractive index as the first substrate 7. The solidifiable layer 7a may be formed from the same material or include the same material as the first substrate 7.

A replication tool 2 is used to impart surface structures into the layer of solidifiable material 7a. Nip rolls 12 may be used to press the solidifiable material against the replication tool 2. In the exemplary method illustrated in FIG. 1, a first source of radiation 11, such as a UV light or heat source, provides radiation for solidifying, which in this exemplary embodiment includes curing, the first layer of solidifiable material 7a on the first flexible substrate 7 to produce the first flexible film 8. In alternative embodiments of the present disclosure, the first flexible film 8 may be produced using another method that involves imparting surface structures in a thermoplastic material, for example, by extrusion. In such exemplary embodiments, the flexible film 8 can be solidified by cooling.

Figure 2A:
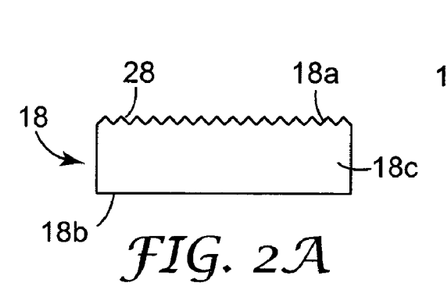
FIG. 2A shows a schematic cross-sectional view of an exemplary film according to the present disclosure at the location designated as 2A-2A in FIG. 1.

FIG. 2A shows a schematic cross-sectional view of an exemplary flexible film 18, which may be an optical film, at the location designated as 2A-2A in FIG. 1. This exemplary flexible film 18 has a structured surface 18a including a plurality of surface structures 28, such as triangular prisms, a surface 18b disposed generally opposite the structured surface 18a and a substrate portion 18c, which may include the same material as the material used to from the surface structures 28, or it may include a different material.

In some exemplary embodiments, the surface 18b may be structured or matte.

Referring further to FIG. 1, the apparatus 10 also includes a coating head 4 for coating a second flexible substrate 3 with a second layer of solidifiable material 3a. As with the first layer of solidifiable material 7a described above, on one hand, the second layer of material 3a is discharged from the coating head 4 in sufficiently liquid or flowing state to form a coating on the second substrate 3, and, on the other hand, the second layer of material 3a is capable of being subsequently solidified to retain a particular shape.

Various materials can be used for the second flexible substrate 3. Where the methods described herein are used to make an optical body, it is contemplated that the flexible substrate usually will include a substantially optically transparent material, or, in some exemplary embodiments, a substantially optically clear material. Exemplary materials suitable for making flexible substrates include, but are not limited to, polymeric materials, such as acrylics, polycarbonates, polypropylenes, polyurethane, polystyrene, polyesters, polyethylenes, such as polyethylene naphthalate (PEN), polyethylene terephthalate (PET), polyvinyl chloride, copolymers of any of these materials and other suitable materials. The same or different materials may be used for the first flexible substrate 7 and the second flexible substrate 3.

The second layer of solidifiable material 3a useful for making optical bodies usually will include a substantially optically transparent material, or, in some exemplary embodiments, a substantially optically clear material. Exemplary materials suitable for use as the second solidifiable material 3a include suitable polymeric materials, for example, such as radiation (e.g., UV radiation or heat) curable materials, thermoplastic materials, thermoset materials and others. Exemplary suitable radiation curable materials include acrylics, such as poly (methyl methacrylate) (PMMA), UV radiation curable acrylate resins, such those described in US 2002/0123589, now U.S. Pat. No. 6,541, 591, the disclosure of which is incorporated by reference herein, and radiation (e.g., UV radiation) curable resins disclosed in U.S. Pat. Nos. 5,254,390 and 4,576,850, the disclosures of which are incorporated by reference herein. In some exemplary embodiments, the refractive index of the material of the second solidifiable layer 3a is higher than that of at least a layer of the flexible substrate 3 or it can be lower than that of at least a layer of the second flexible substrate 3. In one exemplary embodiment, the second flexible substrate 3 is a polyester film and the solidifiable material is resin, such as a UV light-curable resin. Depending on the desired optical, mechanical or other properties of an article of the present disclosure, one or more of the materials used to make the first flexible substrate 7 and the first layer of solidifiable material 7a can be the same as or different from one or more of the materials used to make the second flexible substrate 3 and the second layer of solidifiable material 3a.

After the second flexible substrate 3 is coated with the second layer of solidifiable material 3a, it is pressed against the first flexible film 8, for example, using opposing nip rolls 5. In this exemplary method and apparatus, the first flexible film 8 is used to impart surface structures into the second layer of solidifiable material 3a. Those of ordinary skill in the art will readily appreciate that where the first flexible film 8 includes a thermoplastic material, measures may need to be taken to prevent the solidifiable material 3a from melting the first flexible film 8. For example, it may be advantageous to cool the first flexible film 8 or/and to select the material of at least the outer layer (e.g., the first layer 7a) of the first flexible film 8 so that its melting temperature or glass transition temperature (Tg) is lower than the melting temperature or Tg of the second solidifiable material 3a. Thus, according to the present disclosure, the first flexible film 8 can be used in place of a replication tool to produce another film product having a structured surface that mates with the structured surface of the first flexible film 8.

Figure 2B:
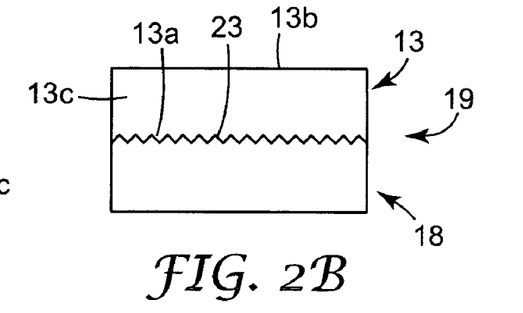
FIG. 2B shows a schematic cross-sectional view of an exemplary article of the present disclosure at the location designated as 2B-2B in FIG. 1.

In the exemplary method illustrated in FIG. 1, a second source of radiation 6, such as a UV light or heat source, provides radiation for solidifying, which in this exemplary embodiment may constitute curing, the layer of solidifiable material 3a between the first flexible film 8 and the flexible substrate 3 to produce an article 9, which includes the first flexible film 8 and a second flexible film shown in detail in FIG. 2B. The article 9 may be an optical body including one or more optical films. In alternative embodiments of the present disclosure, the second flexible film may be produced using another method, involving imparting surface structures in a thermoplastic material, for example, by coextrusion with the first flexible film 8.

FIG. 2B shows a schematic cross-sectional view of an exemplary article 19, which may be an optical body, at the location designated as 2B-2B in FIG. 1. This exemplary article 19 includes a first flexible film 18, schematically illustrated in more detail in FIG. 2A, and a second flexible film 13, which may be an optical film. The second flexible film 13 has a structured surface 13a including a plurality of surface structures 23, such as triangular prisms, a surface 13b disposed generally opposite the structured surface 13a and a substrate portion 13c, which may include the same material as the material used to from the surface structures 23, or it may include a different material. In some exemplary embodiments, the surface 13b may be structured or matte. Because the structured surface 13a is formed against the structured surface 18a of the first flexible film 18, the structured surface 13a releaseably mates with the structured surface 18a. This will be understood further in view of the descriptions of exemplary releaseably mating structured surfaces provided below.

Figure 3A:
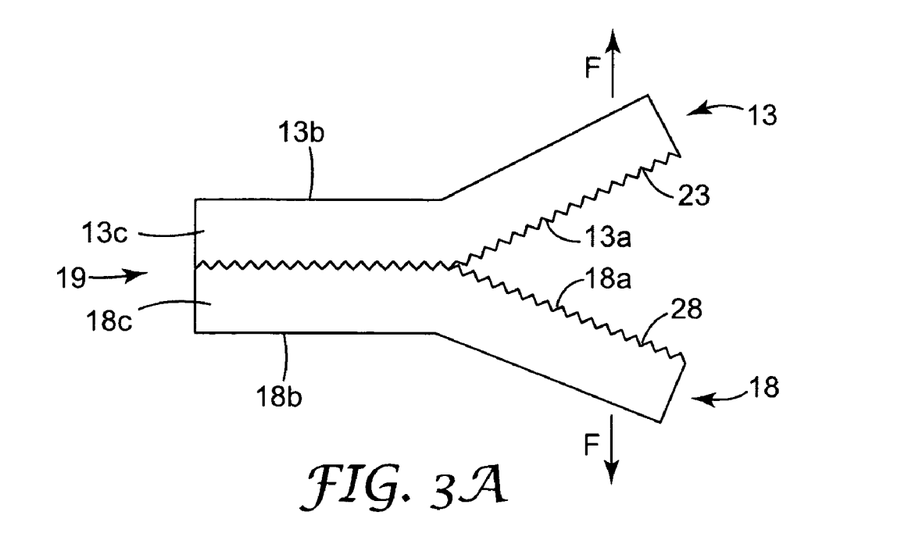
FIG. 3A illustrates applying force to an article of the present disclosure to produce two separate film products.

In typical embodiments of the present disclosure, the mating structured surfaces 18a and 13a can remain releasably engaged with one another during handling, shipping, inspection and further processing. However, when a customer is ready to use the flexible films 18 and 13, the customer can separate the films, as illustrated in FIG. 3A, by applying force (usually, only a small amount of force is needed) to the article 19 in generally opposing directions, as illustrated by the arrows F. As a result, the surfaces 18a and 13a can be released from one another to produce two separate film products 18 and 13, each having mating structured surfaces 18a and 13a, respectively. In typical embodiments of the present disclosure, each structured surface readily releases the mating surface without a release agent. However, in some exemplary embodiments, it may be desirable to coat the first flexible film 8 shown in FIG. 1 with a release agent prior to using the film to impart surface structures into the layer of solidifiable material 3a. Exemplary release agents include but are not limited to silicone and suitable fluorochemicals.

Figure 3B:
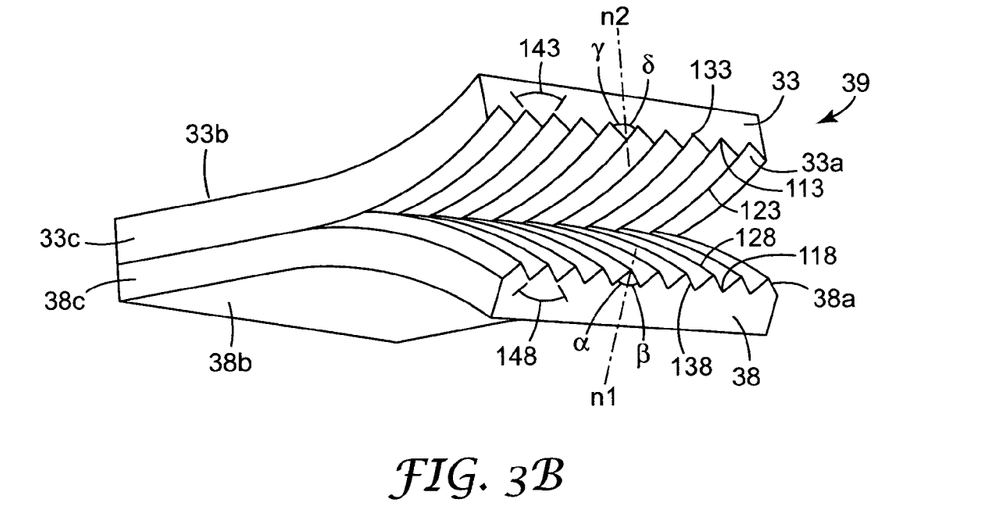
FIG. 3B is a schematic perspective view illustrating an exemplary orientation of two mated film products that have been partially separated.

If an article of the present disclosure includes flexible films with structured surfaces bearing linear prismatic structures, the flexible films are usually separated substantially along the direction of the prism peaks, as shown in FIG. 3B. FIG. 3B shows an article 39, such as an optical body, which includes a first flexible film 38 and a second flexible film 33, which may be optical films. The first flexible film 38 has a structured surface 38a including a plurality of linear prismatic structures 138, such as triangular prisms, a surface 38b disposed generally opposite the structured surface 38a and a substrate portion 38c, which may include the same material as the material used to from the surface structures 138, or it may include a different material. The prismatic structures 138 each have a peak 128, a valley 118 and a peak angle 148. Each peak angle of the first flexible film 38 may be characterized by a first included angle α measured between the normal n1 and a facet of the prismatic structure and a second included angle β measured between the normal n1 and the opposing facet of the same prismatic structure.

The second flexible film 33 has a structured surface 33a including a plurality of linear prismatic structures 133, such as triangular prisms, a surface 33b disposed generally opposite the structured surface 33a and a substrate portion 33c, which may include the same material as the material used to from the surface structures 133, or it may include a different material. The prismatic structures 133 each have a peak 123, a valley 113 and a peak angle 143. Each peak angle of the second flexible film 33 may be characterized by a first included angle γ measured between the normal n2 and a facet of the prismatic structure and a second included angle δ measured between the normal n2 and the opposing facet of the same prismatic structure.

As shown in FIG. 3B, the structured surfaces 33a and 38a releaseably mate so that the peaks 123 and 128 can fit within the corresponding valleys 113 and 118. In some exemplary embodiments, the peak angles 143 and 148 are both about 90 degrees. The first and second included angles of the flexible films 38 and 33 may be substantially equal to each other or they may be different. The embodiments in which the first included angles α and γ are different from the second included angles β and δ may be used, for example, as turning films.

Exemplary structured surfaces may include prismatic structures that have peaks, valleys or both peaks and valleys that do not form a straight line. Instead, the heights of the peaks of the prisms of the film may vary continuously along their lengths. Similarly, the depths of the valleys may vary continuously along their lengths. Such structured surfaces are described in U.S. Pat. No. 6,354,709 to Campbell et al., assigned to 3M Innovative Properties Company, the disclosure of which is hereby incorporated by reference herein. Additionally or alternatively, exemplary structured surfaces of the present disclosure may include zones of prism elements that have varying heights, e.g., a zone of one or more relatively shorter prism elements and a zone of one or more relatively taller prism elements, as described in U.S. Pat. No. 5,771,328 to Wortman et al., assigned to 3M Innovative Properties Company, the disclosure of which is hereby incorporated by reference herein. In some exemplary embodiments, structured surfaces according to the present disclosure may include prisms formed with differing peak or side angles as compared to its respective neighbor prisms or prisms formed with a common peak angle but with a varied prism orientation, as described in U.S. Pat. No. 6,356,391 to Gardiner et al., assigned to 3M Innovative Properties Company, the disclosure of which is hereby incorporated by reference herein.

Thus, exemplary flexible films included in the articles constructed according to the present disclosure have at least one structured surface. In some exemplary embodiments, the two flexible films may have substantially the same structure, but in other exemplary embodiments the films can be different, which can allow making films with different functionalities using the same production line. The flexible films included into the articles constructed according to the present disclosure may be substantially transparent, substantially optically clear or substantially opaque, depending on the application.

The shape of the structured surface can be any desired shape. For example, the structured surface may include a plurality of linear triangular prisms, such as those shown in FIG. 3B. In some exemplary embodiments, the triangular prisms are right isosceles prisms, while other exemplary embodiments can include prisms having peak angles in the range of about 30 degrees to about 120 degrees, about 40 degrees to about 75 degrees, about 60 degrees to about 75 degrees, about 50 degrees to about 110 degrees, about 70 degrees to about 110 degrees or any other suitable angle or angle range. Such exemplary structured surfaces are described, for example, in U.S. Pat. No. 4,984,144 to Cobb et al., U.S. Pat. No. 6,052,164 to Cobb et al., U.S. Pat. No. 6,356,391 to Gardiner et al. and U.S. Pat. No. 6,091,547 to Gardiner et al., all assigned to 3M Innovative Properties Company, and the disclosures of which are hereby incorporated by reference herein. In some exemplary embodiments, peak angles of 70 degrees or less may be desired, such as where at least one of the films is intended to be used as a turning film.

Figure 4:
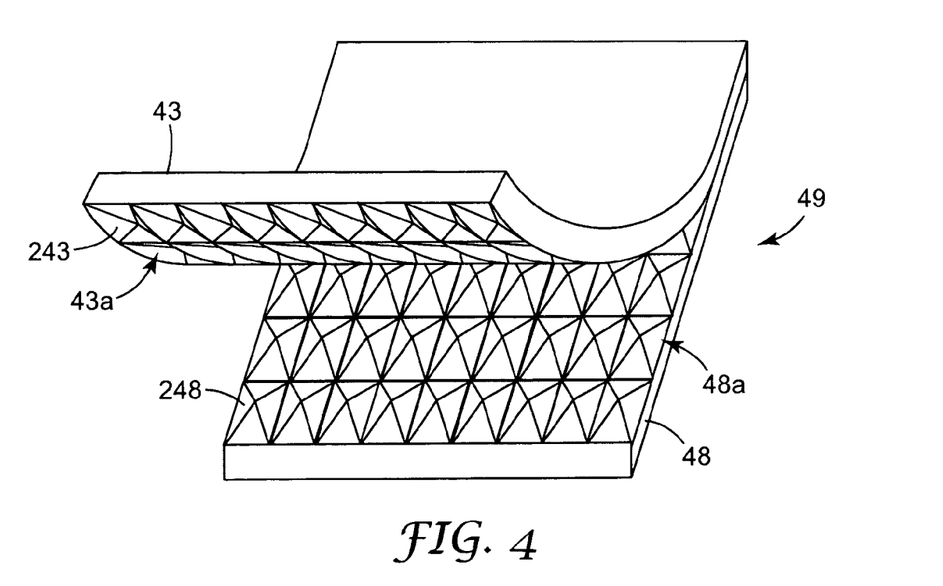
FIG. 4 shows schematically another exemplary embodiment of an article constructed according to the present disclosure.

Exemplary articles constructed according to the present disclosure may include flexible films having structured surfaces of other configurations. For example, FIG. 4 shows an exemplary article 49, such as an optical body, which includes a first flexible film 48 having a structured surface 48a and a second flexible film 43 having a structured surface 43a that releaseably mates with the structured surface 48a. The structured surface 48a includes a plurality of pyramidal structures 248, which in some exemplary embodiments are rectangular-based pyramids or square-based pyramids. The pyramidal structures may be disposed in an aligned or offset configuration with respect to each other. Such structured surfaces are described in U.S. application Ser. No. 10/989,161, now U.S. Patent Application Publication No. 2006/0103777, by Ko et al., filed Nov. 15, 2004, and U.S. application Ser. No. 11/026,938, now U.S. Patent Application Publication No. 2006/0152943, by Ko et al., filed Dec. 30, 2004, both assigned to 3M Innovative Properties Company, the disclosures of which are hereby incorporated by reference herein.

The structured surface 43a includes a plurality of inverted pyramidal structures 243, which in some exemplary embodiments are rectangular-based inverted pyramids or square-based inverted pyramids. Generally, when the two flexible films 48 and 43 are releaseably mated, a protrusion formed by a pyramid 248 fits within a depression formed by an inverted pyramid 243. The inverted pyramidal structures may be disposed in an aligned or offset configuration with respect to each other. Such structured surfaces are described in U.S. application Ser. No. 11/026,872, now U.S. Patent Application Publication No. 2006/0146566, by Ko et al., filed Dec. 30, 2004, assigned to 3M Innovative Properties Company, the disclosure of which is hereby incorporated by reference herein.

Figure 5:
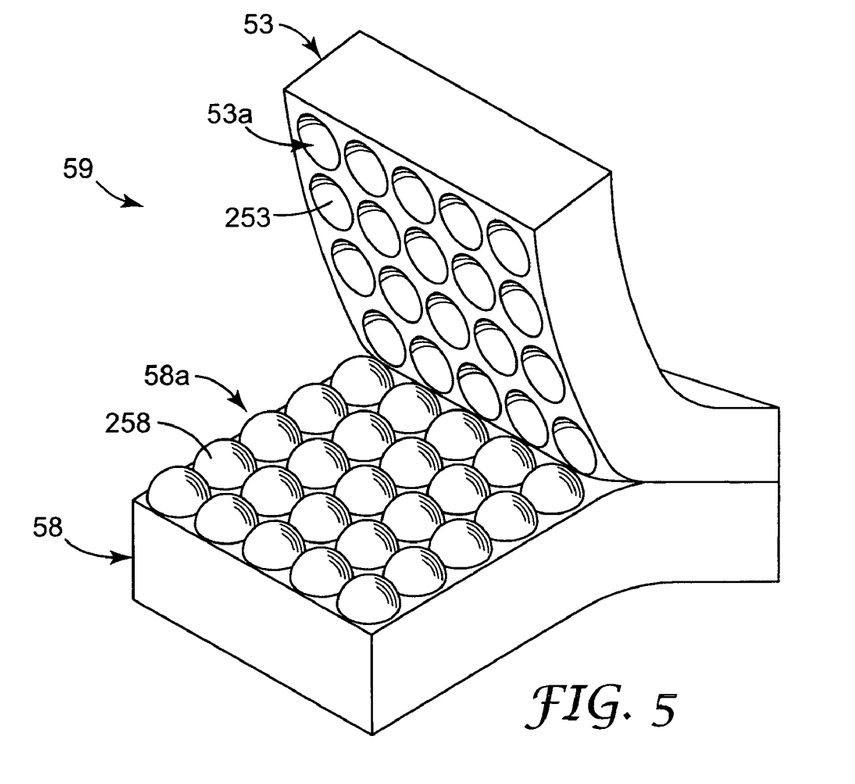
FIG. 5 shows schematically another exemplary embodiment of an article constructed according to the present disclosure.

FIG. 5 shows another exemplary article 59 constructed according to the present disclosure. The exemplary article 59, which may be an optical body, includes a first flexible film 58 having a structured surface 58a and a second flexible film 53 having a structured surface 53a that releaseably mates with the structured surface 58a. The structured surface 58a includes a plurality of rounded protrusions 258, which in some exemplary embodiments are substantially hemispherically-shaped protrusions. The structured surface 53a includes a plurality of rounded depressions 253, which in some exemplary embodiments are substantially hemispherically shaped depressions. Generally, when the two flexible films 58 and 53 are releaseably mated, a protrusion 258 fits within a depression 253. Exemplary structured surfaces including rounded protrusions and/or depressions are described in U.S. application Ser. No. 11/026,940, now U.S. Patent Application Publication No. 2006/0146562, by Ko et al., filed Dec. 30, 2004, assigned to 3M Innovative Properties Company, the disclosure of which is hereby incorporated by reference herein.

Figure 6:
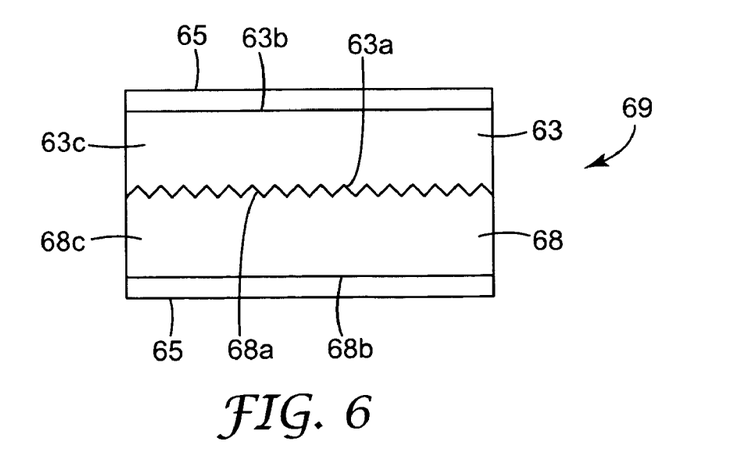
FIG. 6 shows schematically yet another exemplary embodiment of an article constructed according to the present disclosure.

FIG. 6 shows another exemplary embodiment of an article 69, such as an optical body, constructed according to the present disclosure. The article 69 includes flexible films 68 and 63, e.g., as described in reference to FIGS. 2A-5. The flexible films 68 and 63 have releaseably mated structured surfaces 68a and 63a, additional surfaces 68b and 63b and substrate portions 68c and 63c. The article 69 may further include one or more protective premasks 65 disposed on one or more of the surfaces 68b and 63b. The one or more premasks can be applied at any time to protect one or more surfaces of the article. Some exemplary materials suitable for making premasks include polyolefins, such as polyethylene and polypropylene. The one or more protective premasks 65 may be constructed and applied to the articles of the present disclosure as it would be known to those of ordinary skill in the art. As explained above, one or more of the surfaces 63b and 68b may be matte or structured.

One or more of the substrate portions of optical films constructed according to the present disclosure can include a polarizer, a diffuser and any number or combination thereof. In some exemplary embodiments, the one or more of substrate portions may include a linear reflective polarizer, such as a multilayer reflective polarizer, e.g., Vikuiti™ Dual Brightness Enhancement Film ("DBEF") or a diffuse reflective polarizer having a continuous phase and a disperse phase, such as Vikuiti™ Diffuse Reflective Polarizer Film ("DRPF"), both available from 3M Company. In other exemplary embodiments, the substrate portion may include a linear or circular cholesteric polarizer. Additionally or alternatively, the substrate portion may include a polycarbonate layer ("PC"), a poly methyl methacrylate layer ("PMMA"), a polyethylene terephthalate layer ("PET") or any other suitable film or material known to those of ordinary skill in the art. In some exemplary embodiments, the first substrate portion may include a film capable of performing a different optical function than the second substrate portion. For example a first substrate portion may include a linear reflective polarizer, such as a multilayer reflective polarizer, and the second substrate portion may include an isotropic film, such as an isotropic polycarbonate film.

Exemplary embodiments of the present disclosure may be transported to a customer in the form of one or more rolls. However, sometimes an end user, such as a display manufacturer, may wish to receive an article, such as an optical body, that is already converted, i.e., cut or otherwise shaped into a configuration that is more suitable for the customer's application. For example, an optical body may be converted to produce a smaller substantially rectangular shape, such that one or more of its constituent films may form a display component. In that case, the optical body is usually cut to fit a particular display. Accordingly, the methods of the present disclosure may further include converting the articles, such as optical bodies, of the present disclosure before separating the mated films included therein. Conversion prior to separation of the films may be particularly advantageous where the process of conversion is likely to produce loose particles that can contaminate the structured surface or to cause damage to the structured surface.

EXAMPLE

Figure 7:
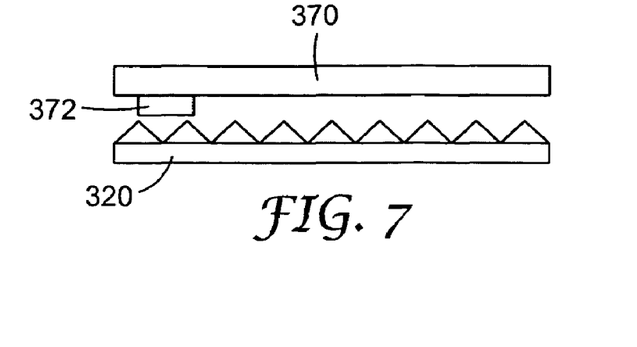
FIG. 7 shows schematically a process step in making an exemplary embodiment of the present disclosure.

An exemplary optical body was made as follows:

1) A sandwich-type construction was made as shown in FIG. 7 that included a tool 320 with linear prismatic surface structures having included angles of about 90 degrees, a PET flexible substrate 370, and a bead of resin 372 described in U.S. Application Publication No. 2002/0123589, U.S. Pat. No. 6,541,591, and having the following formulation: MPSMA—43%, NOEA—57%, TPO—2% and FC430—0.3%.

Figure 8:
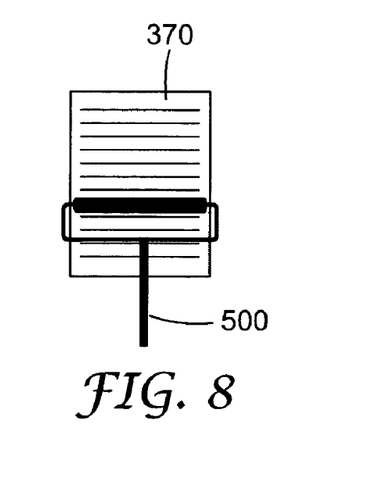
FIG. 8 shows schematically another process step in making an exemplary embodiment of the present disclosure.

2) The resin 372 was spread between the substrate 370 and the tool 320 with a hand roller 500, as shown in FIG. 8, to produce a resin layer 370a (shown in FIG. 9) of about 20-30 microns thick.

Figure 9:
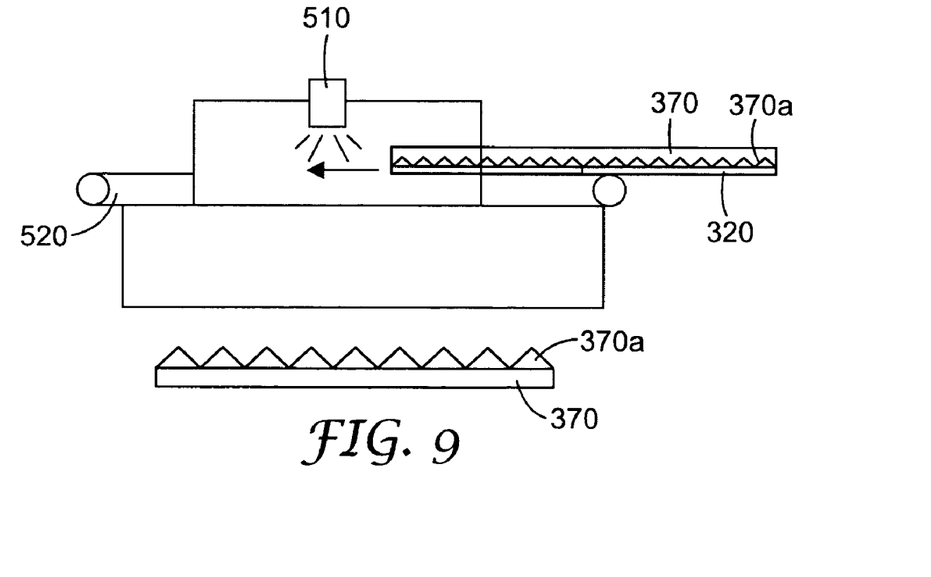
FIG. 9 shows schematically another process step in making an exemplary embodiment of the present disclosure.

3) The sandwich-type construction was then sent through a UV light curing station shown in FIG. 9, which included a 300 Watt UV light source 510 and a line 520 with the speed of about 25 feet/min.

4) The substrate 370 with the structured layer of cured resin 370a were then separated from the tool.

5) Steps 1 and 2 above were repeated with the structure of step 4 used in place of the tool 320 to form a sandwich-type construction including the substrate 370 with the structured layer of cured resin 370a and a substrate 330 with a layer of curable resin 330a.

Figure 10:
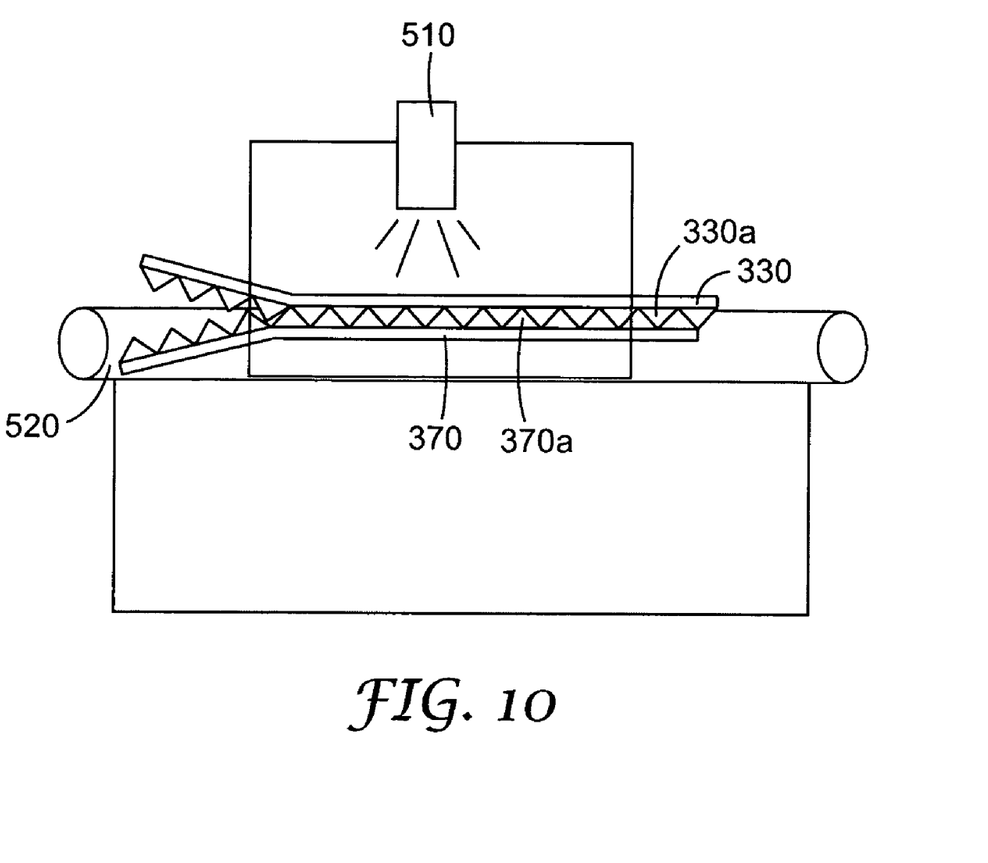
FIG. 10 shows schematically yet another process step in making an exemplary embodiment of the present disclosure.

6) The sandwich-type construction produced in step 5 was sent through the UV light curing station described in step 3 as shown in FIG. 10.

7) The substrate 330 with the structured layer of cured resin 330a were then separated from the substrate 370 with the structured layer of cured resin 370a to form two optical film products.

Thus, the present disclosure provides articles, such as optical bodies, having mating structured surfaces and processes for making such articles that could significantly reduce manufacturing costs. For example, the methods of the present disclosure allow replication of a flexible film product using another flexible film product instead of a reusable tool. The resulting composite article can be left intact during shipment and handling until a customer is ready to use the films. This allows the structured surface of one film to be protected by the mating structured surface of another film. Accordingly, the articles of the present disclosure do not require a premask on the structured surface, which reduces product cost. Shipping costs are also reduced, as the premasks usually add weight and bulk to the film products.

Another potential advantage of the present disclosure is that inspection costs of the film products can be reduced. Because the structured surface is protected by the mating surface that was used in replication, replication damage to that surface is less likely to occur making its inspection unnecessary. Further advantages of the present disclosure include increased production capacity and decreased labor costs, because twice as much product can be made per tool and per replication line. Converting costs also can be reduced, because each converted piece will yield two parts of the film product.

Although the methods and articles of the present disclosure have been described with reference to specific exemplary embodiments, those of ordinary skill in the art will readily appreciate that changes and modifications may be made thereto without departing from the spirit and scope of the present disclosure.

What is claimed is:

1. An article comprising:
a first optical film comprising a structured surface; and
a second optical film comprising a structured surface;
wherein the structured surface of the first optical film is releaseably mated to the structured surface of the second optical film;
wherein structured surfaces of the first and second optical films each comprise a plurality of linear triangular prisms; and
wherein each of the plurality of prism is further characterized by a first and second included angle and wherein the first included angle is different from the second included angle.

2. The article of claim 1, wherein the pluralities of prisms have peak angles in the range of about 50 degrees to about 110 degrees.

3. The article of claim 1, wherein the pluralities of prisms have peak angles equal to about 90 degrees.

4. The article of claim 1, wherein the pluralities of prisms have peak angles of about 70 degrees or less.

5. The article of claim 1, wherein at least one of the first and second optical films comprises a substrate portion, and wherein the substrate portion comprises a polarizer, a diffuser, or a combination thereof.

6. The article of claim 5, wherein the polarizer is a liner reflective polarizer.

7. The article of claim 1, wherein the first optical film comprises a linear reflective polarizer and the second optical film comprises isotropic polycarbonate.

8. The article of claim 1, wherein at least one of the first and second optical films further comprises a matte surface or an additional structured surface disposed opposite the structured surface.

9. The article of claim 1, further comprising at least one premask disposed on a surface of at least one of the first and second optical film.

10. The article of claim 1, wherein at least one of the first and second optical films is substantially optically transparent.

11. The article of claim 1, wherein at least one of the first and second optical films is substantially opaque.

12. The article of claim 1, wherein the first and second optical films each have a maximum thickness of no more than 750 microns.

13. The article of claim 1, wherein the first and second optical films each comprise a polymeric material.

14. The article of claim 1, wherein the first and second films comprise the same material.

15. The article of claim 1, wherein at least one of the first and second films comprises a thermoplastic material.

16. The article of claim 1, further comprising a release agent disposed between the first and second films.

* * * * *

UNITED STATES PATENT AND TRADEMARK OFFICE
CERTIFICATE OF CORRECTION

PATENT NO. : 7,379,245 B2 Page 1 of 1
APPLICATION NO. : 11/145753
DATED : May 27, 2008
INVENTOR(S) : James A. Stevenson It is certified that error appears in the above-identified patent and that said Letters Patent is hereby corrected as shown below:

Column 4
Line 25, Delete "from" and insert -- form --, therefor.
Line 27, Delete "In some exemplary embodiments, the surface 18b may be structured or matte." and insert on line 26 after "material." as the continuation of the same paragraph.
Line 38, Delete "Various materials can be ................ flexible substrate 3." and insert on line 37 after "shape." as the continuation of the same paragraph.

Column 5
Line 59, Delete "from" and insert -- form --, therefor.

Column 6
Line 32, Delete "from" and insert -- form --, therefor.
Line 45, Delete "from" and insert -- form --, therefor.

Column 9
Line 41, After "No. 2002/0123589," insert -- now --.

Column 10
Line 59, In Claim 6, delete "liner" and insert -- linear --, therefor.

Signed and Sealed this

Nineteenth Day of August, 2008

JON W. DUDAS
*Director of the United States Patent and Trademark Office*